US009039590B2

(12) United States Patent
Daughtry et al.

(10) Patent No.: US 9,039,590 B2
(45) Date of Patent: May 26, 2015

(54) INTERNALLY REINFORCED HEADER BAG

(75) Inventors: Eric Daughtry, Boones Mill, VA (US); Gary Howard, Wirtz, VA (US); Fred Daughtry, Hardy, VA (US)

(73) Assignee: Inteplast Group Inc., Livingston, NJ (US)

( * ) Notice: Subject to any disclaimer, the term of this patent is extended or adjusted under 35 U.S.C. 154(b) by 522 days.

(21) Appl. No.: 13/368,557

(22) Filed: Feb. 8, 2012

(65) Prior Publication Data

US 2013/0203576 A1 Aug. 8, 2013

(51) Int. Cl.

| | |
|---|---|
| ***B31B 1/64*** | (2006.01) |
| ***B31B 37/00*** | (2006.01) |
| ***B31B 19/90*** | (2006.01) |
| ***B31B 19/36*** | (2006.01) |
| ***B31B 23/00*** | (2006.01) |
| ***B31B 41/00*** | (2006.01) |
| ***B29C 65/10*** | (2006.01) |
| ***B65D 33/08*** | (2006.01) |
| ***B31B 19/00*** | (2006.01) |
| ***B65D 33/02*** | (2006.01) |

(52) U.S. Cl.

CPC ................ *B65D 33/08* (2013.01); *B31B 19/00* (2013.01); *B31B 2219/9093* (2013.01); *B31B 2219/9096* (2013.01); *B31B 2237/10* (2013.01); *B31B 2237/406* (2013.01); *B65D 33/02* (2013.01)

(58) Field of Classification Search

CPC ...... B31B 1/64; B31B 37/00; B31B 2237/05; B31B 19/90; B31B 19/36; B31B 23/00; B31B 41/00; B31B 2237/50; B29C 53/821; B29C 65/10; B29C 66/1122; B29C 66/43

USPC ......... 493/189, 210, 297, 381, 217, 221, 226, 493/330, 344, 345, 346, 349

See application file for complete search history.

(56) References Cited

U.S. PATENT DOCUMENTS

| | | | | | |
|---|---|---|---|---|---|
| 3,548,723 | A | * | 12/1970 | Sengewald | 493/194 |
| 3,797,733 | A | * | 3/1974 | Ibing | 383/119 |
| 3,877,352 | A | * | 4/1975 | Brieske | 493/199 |
| 4,913,693 | A | * | 4/1990 | Ball et al. | 493/194 |
| 5,814,382 | A | * | 9/1998 | Yannuzzi, Jr. | 428/34.3 |
| 6,098,800 | A | * | 8/2000 | Bennish et al. | 206/439 |
| 6,186,934 | B1 | * | 2/2001 | Addison | 493/226 |
| 8,251,881 | B2 | * | 8/2012 | Chertkow et al. | 493/189 |
| 8,267,580 | B2 | * | 9/2012 | Schneider | 383/104 |
| 2004/0032993 | A1 | * | 2/2004 | Tetenborg | 383/17 |
| 2004/0132599 | A1 | * | 7/2004 | Colla | 493/11 |
| 2007/0071370 | A1 | * | 3/2007 | Schneider | 383/119 |
| 2011/0019937 | A1 | | 1/2011 | Steinwagner et al. | |

* cited by examiner

*Primary Examiner* — Michelle Lopez

(74) *Attorney, Agent, or Firm* — Senniger Powers LLP

(57) ABSTRACT

Systems, devices, and methods are described for providing a bag having an internally reinforced header. A reinforcing material is combined with a bag material to provide strength to the reinforced header. The reinforcing material and the bag material are aligned during manufacturing such that the reinforcing material is positioned in a header area of a bag formed by folding the bag material. A seal that passes through both the reinforcing material and the bag material retains the reinforcing material within the bag header. A bag handle may then be punched into the header through the bag material and the reinforcing material.

22 Claims, 6 Drawing Sheets

INTERNALLY REINFORCED HEADER BAG

BACKGROUND

Large bags and bags used for packaging heavy contents often require increased strength to withstand packaging processes and post-packaging handling. To provide the increased strength, areas of a bag in which stress tends to be focused can be strengthened to avoid breaking and spilling contents of the bag. In particular, stresses are typically focused in the area of a bag handle during handling. If the handle has inadequate strength, it may cause discomfort to the user, and the handle may stretch or tear, making handling the bag difficult, especially when the bag is large or holds heavy contents.

Manufacturing processes have been developed to reinforce the handles of heavy duty bags by adding extra material in the handle area of the bag. In one approach, the material at an edge of the bag is gusseted by folding the material into itself to double the number of layers of material at the edge of the bag. The gusseted edge is then sealed, and a handle is punched through the gusseted material. In other approaches, extra material is added to the outside of the bag in the handle area. For example, a strip of material may be folded over the top of the bag and attached to the outside of the bag. A handle is then punched through the top of the bag, passing through both the bag material and the exterior reinforcing material.

Conventional approaches for reinforcing bag headers with extra material can provide extra strength to withstand handling, but the approaches can also lead to complications that may compromise the integrity of a bag or detract from the appearance of the bag. For example, when an extra strip of material is applied to the exterior of the bag, the applied material may interfere with graphics that are printed onto the bag. The extra material creates edges where the material is attached to the bag exterior, and the edges may not be easily printed over, thus interrupting graphics applied to the bag. In gusseted approaches, the gusset at the top of the bag may be undesirable as it also may detract from the appearance of the bag.

SUMMARY

Disclosed herein are systems, devices, and methods for providing a bag having a reinforced header and strengthened handle. In particular, the systems, devices, and methods provide a bag having a header that is internally reinforced. The header portion of the bag includes a reinforcing material that is sealed to the interior of the material from which the bag is made. The internally-located reinforcing material reduces interference with the appearance of the bag exterior or graphics printed on the bag exterior, and the internal placement of the reinforcing material is incorporated into a streamlined manufacturing process.

In some embodiments, a method of manufacturing reinforced bags includes providing a bag material, providing a reinforcing material, aligning the reinforcing material with an area of the bag material that forms a header of the bag, folding the bag material at a center line of the bag material, and applying a seal that passes through the bag material and the reinforcing material. Folding the bag material at the center line positions the reinforcing material in an interior region of the bag material, and the seal retains the reinforcing material in the interior region of the bag header.

In certain implementations, the reinforcing material is attached to the bag material before applying the seal. The reinforcing material can be attached to the bag material with one of a mechanical fastener, an adhesive, stitching, a hot tack seal, a cold pressure seal, or a static pin. The reinforcing material can be temporarily attached to the bag material, and the seal can permanently attach the materials.

The reinforcing material may be aligned with a center line of the bag material. In certain implementations, an edge of the reinforcing material is disposed adjacent to the center line. The seal is then applied through two layers of the bag material and one layer of the reinforcing material. A lower portion of the reinforcing material extends below the seal, and the seal prevents shifting of the reinforcing material relative to the bag material.

In certain implementations, the reinforcing material is centered on the center line of the bag material. When the bag material is folded at the center line, the reinforcing material is also folded at a center line of the reinforcing material. The seal is then applied through two layers of the bag material and two layers of the reinforcing material. Two lower portions of the reinforcing material extend below the seal.

In certain implementations, the reinforcing material is aligned with a first edge of the bag material. The first edge of the bag material is sealed to a second edge of the bag material, and the sealed edges form a top of the bag.

In certain implementations, the method includes applying a graphic to an exterior surface of the bag material after aligning the bag material and the reinforcing material. In other implementations, the bag material comprises an exterior graphic that is applied to the bag material before providing the bag material.

In certain implementations, the seal prevents the reinforcing material from shifting relative to the bag material. The method may also include punching a handle into the header of the bag, and the handle may be punched through both the bag material and the reinforcing material.

BRIEF DESCRIPTION OF THE DRAWINGS

The foregoing and other objects and advantages will be appreciated more fully from the following further description thereof, with reference to the accompanying drawings. These depicted embodiments are to be understood as illustrative and not as limiting in any way.

DETAILED DESCRIPTION

To provide an overall understanding of the systems, devices, and methods described herein, certain illustrative embodiments will now be described. For the purpose of clarity in illustration, the systems, devices, and methods will be described with respect to a manufacturing process for creating individual bags as well as creating a roll stock of internally reinforced header bags. It will be understood by one of ordinary skill in the art that the systems, devices, and methods described herein may be adapted and modified as is appropriate and that the systems, devices and methods described herein may be employed in other suitable applications, such as for other types of bags and bag reinforcing approaches, and that other such additions and modifications will not depart from the scope hereof.

Figure 1:
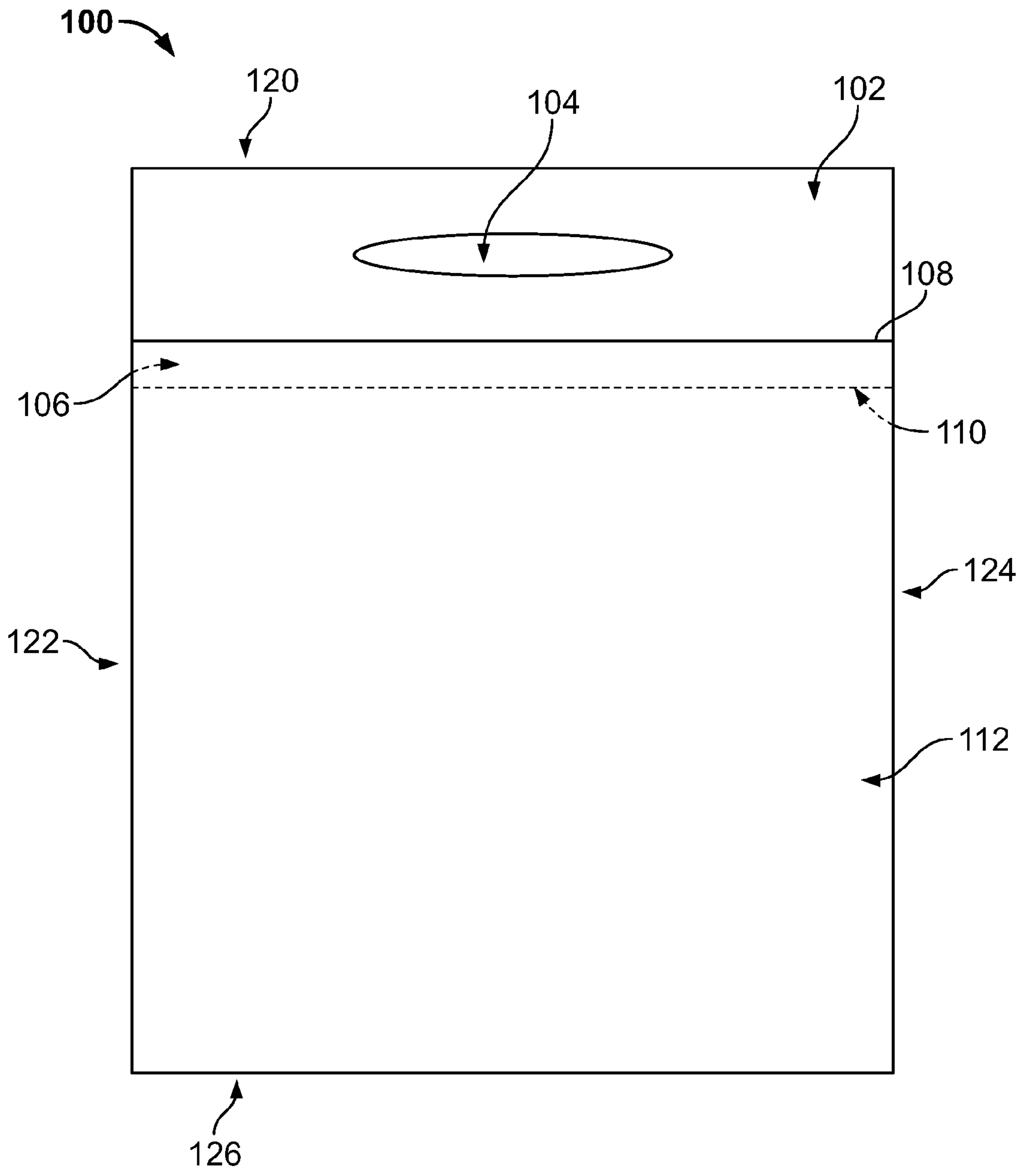
FIG. 1 shows an illustrative bag having an internally reinforced header.

The systems, methods, and devices discussed herein provide bags with headers that are strengthened by internal reinforcement. FIG. 1 shows a bag 100 with a reinforced header area 102 having a handle 104. To provide extra strength to the handle 104, the header 102 is supplemented with an internal reinforcing material 106. The reinforcing material 106 provides extra strength at the handle 104 because the handle 104 is punched through two layers of the film that makes up the exterior of the bag 100, as well as one or more layers of the reinforcing material 106. The reinforcing material 106 is held within the header area 106 by a heat seal 108 that seals the outer panels of the bag 100 and the internal reinforcing material 106 together. The reinforcing material 106 extends slightly beyond the heat seal 108 and ends at the lower boundary 110. Because the reinforcing material 106 extends beyond the seal 108, the full header area 102, extending from the seal 108 to the top of the bag, is strengthened by the reinforcing material 106.

During processing and handling, the bag 100 is able to withstand stress at the handle 104 caused by the weight of contents of the bag 100 as a result of the strength provided by the reinforcing material 106. The increased strength provided by the reinforcing material 106 reduces the risk of the handle 104 deforming or breaking during lifting of the bag 100. The strength provided by the reinforcing material 106 also gives a sturdier hold and may reduce the discomfort felt by a user when holding the bag at handle 104. Additionally, because the reinforcing material 106 is on the interior of the bag 100, the exterior surface 112 of the bag 100 can be printed with graphics that are not interrupted by an edge of the reinforcing material 106. In contrast to manufacturing approaches in which reinforcements are placed on the outside of the bag, the internal position of the reinforcing material 106 reduces interference from creases or edges on the outside of the bag 100 that can interfere with graphics printed on the surface 112. While external placement of material creates abrupt edges that can be difficult to print over, the internal placement of the reinforcing material 106 creates a smoother transition for printing on a bag material placed over the reinforcing material 106.

Figure 2:
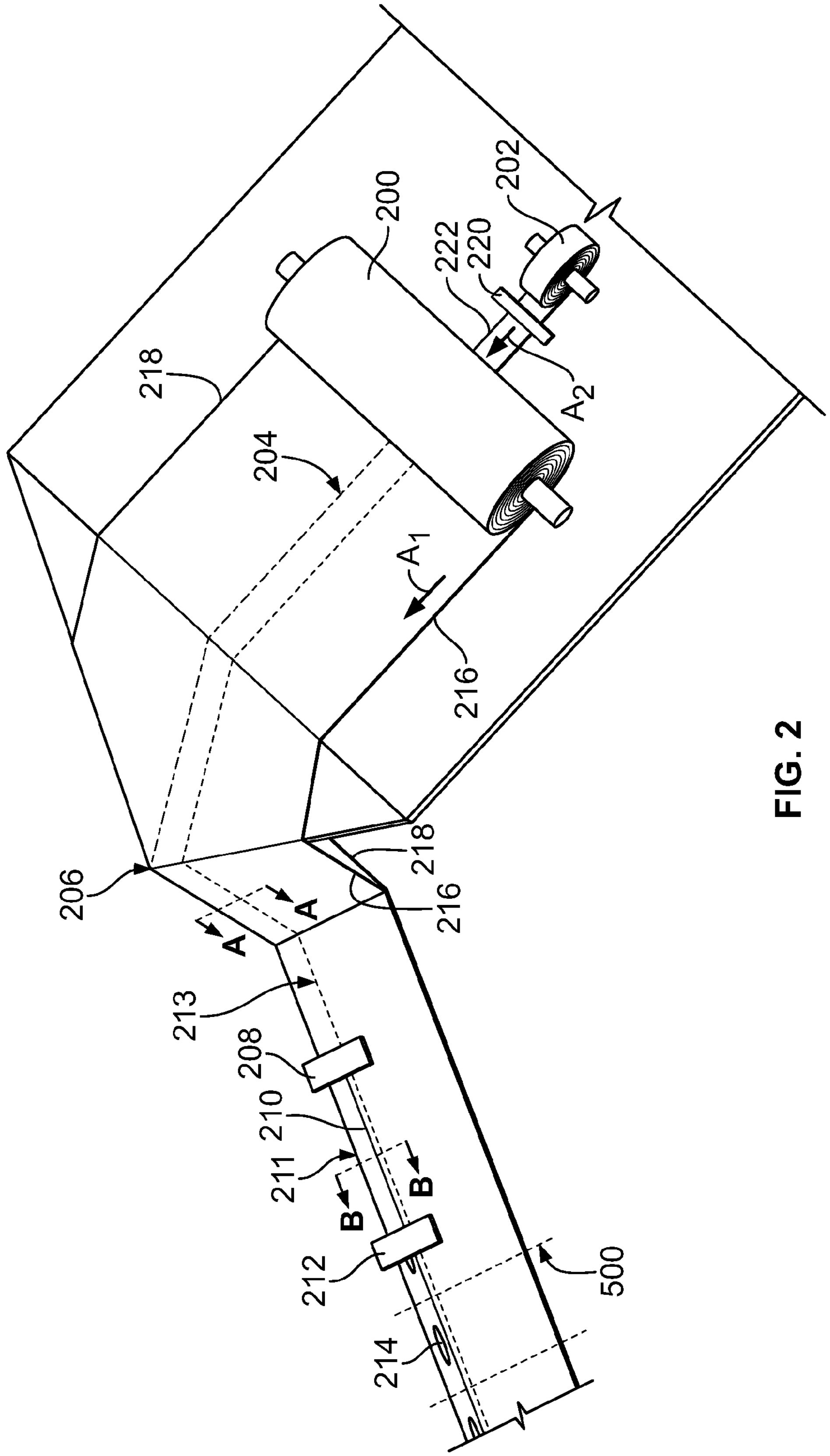
FIG. 2 shows an illustrative process for creating internally reinforced header bags.

An internally reinforced bag, such as the bag 100 shown in FIG. 1, can be produced by a streamlined manufacturing process that incorporates the internal reinforcement into creation of the bag, rather than requiring processing of a normal bag after it is made to add supplemental reinforcement. In addition to streamlining the manufacturing process, the internal reinforcement for the bag header reduces interference with printing graphics on the exterior of the bag during the manufacturing process. A process used for making a reinforced header bag, such as the bag 100, is shown in FIG. 2. In FIG. 2, a bag material 200 and a reinforcing material 202 are used to form a continuous roll stock of reinforced header bags. The roll stock that is produced is a continuous pattern of individual bags, with each having a header reinforced with the reinforcing material 202. Bag handles 214 are cut along the length of the roll stock, with at least one handle cut into the header of each individual bag.

As shown in FIG. 2, a production machine begins creating the bag roll stock by tracking the bag material 200 in the direction of arrow $A_1$. As the bag material 200 is advanced, the reinforcing material 202 is tracked in the direction of arrow $A_2$ to position the reinforcing material 202 underneath the bag material 200 in the orientation shown in FIG. 2. Reinforcing material 202 is aligned with the bag material so that one edge 222 of the reinforcing material is adjacent the center line 204 of the bag material 200. This alignment of the bag and reinforcing materials places the reinforcing material at the portion of the bag material 200 that forms the top of the bags in the finished roll stock, as described below.

During manufacturing, the alignment of the reinforcing material 202 and the bag material 200 is maintained to keep the reinforcing material 202 at the area of the bag material that later forms the header of a finished bag. In certain implementations, it may be preferable to temporarily or permanently attach the reinforcing material 202 and the bag material 200 when they are first aligned to ensure that the alignment does not change, for example during tracking or folding of the materials by the manufacturing machinery. As the reinforcing material 202 is placed under the bag material 200, an optional attaching element 220 may be used to attach the reinforcing material 202 to the underside of the bag material 200. While the attaching element 220 is shown in FIG. 2 positioned before the bag and reinforcing materials are brought into close contact, the attaching element 220 may also be located after the two materials are brought together. The attaching element 220 may be, for example, a mechanical fastener, adhesive, stitching, a hot tack seal, a cold pressure seal, a static pin, or any other suitable attachment element. Alternatively, the two materials may not be attached together and may be maintained in position simply by the tracking of the two materials.

The positioning of the reinforcing material 202 on the underside of the bag material 200 that later forms the interior of a bag allows for flexibility in applying exterior graphics to the bag. Because the reinforcing material 202 is placed on the interior of the bag material rather than the exterior, the bag construction does not need to be completed before a graphic is printed on the bag exterior. In some implementations, graphics are printed on the bag material in a separate process completed before the reinforcing material is introduced and individual bags are formed. Because the reinforcing material is positioned on the interior of the bags, the later placement of the reinforcing material does not obscure the printed graphics. In other implementations, graphics are applied to the exterior of the bag material after the reinforcing material is positioned and before the materials are folded to create a bag. Because the reinforcing material is positioned on the interior of the bag material, printing on the bag exterior is not inhibited by abrupt seams or edges, as there is a smooth transition in the bag material where the reinforcing material is attached to the interior of the bag material.

Once the bag material and reinforcing material are aligned, a corner 206 folds the bag material 200 in half. In certain implementations, the bag material 200 is folded at a fold line offset from the center of the bag material to suit a particular application. In such implementations, the placement of the reinforcing material is modified to move the reinforcing material away from the center of the bag material and maintain alignment of the reinforcing material with the fold. As the bag passes the corner 206, two edges 216 and 218 of the bag material are brought together, and a fold is created at the center line 204. This folding creates the desired orientation of the bag material and the reinforcing material, with the two edges 216 and 218 of the bag material 200 forming the bottom of the bags in the roll stock, and the reinforcing material 202 positioned inside the bag material adjacent the center line 204 at which the fold creates the top of the bags.

Figure 3:
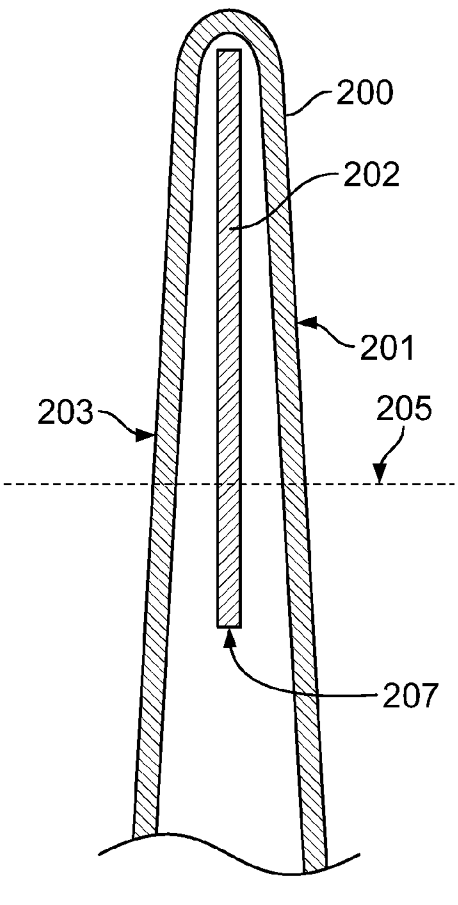
FIG. 3 shows a cross section of the roll stock shown in FIG. 2 taken along the line A-A shown in FIG. 2.

With the bag material 200 folded in half, a reinforced header in the roll stock is positioned where the top of the bags is formed. The header has three layers of material: a first layer of the bag material 200, an interior layer of the reinforcing material 202, and a second layer of the bag material 200. The orientation of these three layers is shown in FIG. 3, which depicts a cross section of the folded roll stock taken along the line A-A shown in FIG. 2. The single strip of reinforcing material 202 is on the interior of the bag material 200, between a first panel 201 and a second panel 203 of the bag material. This orientation provides strengthened support to a handle punched into the header portion.

The folded bag material 200 passes under a sealer 208 that applies a seal near the top of the bag to retain the reinforcing material 202 in the interior of the bag material 200. As the folded roll stock passes the sealer 208, a single continuous seal 210 is applied near the top of the bag. The seal 210 passes through both the bag material 200 and the reinforcing material 202, and thus connects the layers to provide a firm hold to maintain the orientation of the reinforcing material 202 and the bag material 200. This hold supplements the handle strength by keeping the reinforcing material 202 from shifting or slipping relative to the bag material 200 and moving away from the header area. In order to ensure a firm hold on the bag material 200 and reinforcing material 202, the materials are selected such that they can be joined together by the sealer 208 to create the seal 210. Polymeric materials, such as thermoplastics like polyethylene or polypropylene, or any other suitable material capable of being melted or otherwise joined together by the seal 210 may be used.

The seal 210 is disposed at a location near the top 211 of the film roll stock such that a bottom edge 213 of the internal reinforcing material 202 extends below the seal. This location of the seal 210 ensures that the full header of the bag is reinforced by the reinforcing material 202 and holds the reinforcing material 202 in place to keep the reinforcing material from moving around inside of the header or slipping below the header. In certain implementations, the location of the seal 210 may be varied to provide a larger or smaller header area for individual bags. For example, the seal 210 may be located closer to the bottom edge 213 of the reinforcing material 202, or closer to the top 211 of the roll stock. For such alternate locations, it is preferable to locate at least a portion of the seal 210 above the bottom edge 213 of the reinforcing material 202 to ensure that the seal 210 passes through both the bag material 200 and the reinforcing material 202 to prevent shifting of the reinforcing material 202 relative to the bag material 200. The line 205 shown in FIG. 3 indicates the location on the bag and internal reinforcing material where the seal 210 is placed by the sealer 208 in FIG. 2. A lower portion 207 of the reinforcing material 202 extends below the line 205, and thus the full header of the bag positioned above the line 205 is reinforced by three layers of material.

Figure 4:
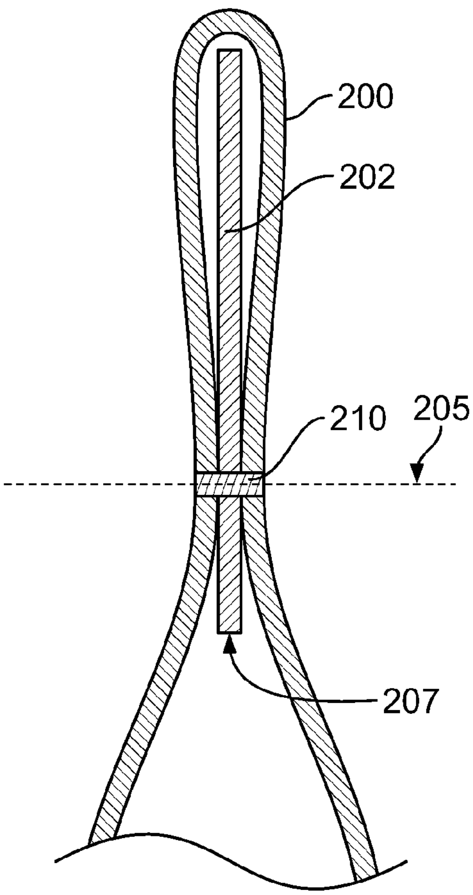
FIG. 4 shows a cross section of the roll stock shown in FIG. 2 taken along the line B-B shown in FIG. 2.

The orientation of the layers after sealing can be shown by viewing a cross section taken at line B-B of FIG. 2. This cross section is shown in FIG. 4. As shown in FIG. 4, the bag header is created by the seal 210 disposed at the location of line 205, and the reinforcing material 202 is kept in its desired alignment relative to the bag material 200. As discussed with respect to FIG. 3, the lower portion 207 of the reinforcing material 202 extends below the seal, and the full header of the bag is reinforced by the two layers of the bag material 200 and one layer of reinforcing material 202. The location of line 205 and seal 210 may be varied, and it is preferable that at least a portion of the seal 210 be located at or above the edge of the lower portion 207 to ensure that the seal 210 passes through both the bag material 200 and the reinforcing material 202.

A cutting element 212 punches handles into the reinforced header to complete creation of the roll stock. The punched handles are spaced as desired for the bags that are later cut from the roll stock. For example, the handles may be spaced such that a single handle is positioned at the center of each individual bag. The handles may also be spaced so that each individual bag has more than one handle. After the handles are punched, the film can be rolled into a roll stock for distribution to a user who then creates and fills individual bags, or individual bags may be cut out of the film and packaged for distribution to the user.

Individual bags can be created from the film shown in FIG. 2 by making cuts at the cut lines 500. The cut lines 500 are located on the bag material 200 equidistant from two handles 214. As a result, each bag produced by the cuts contains a single handle 214 centered in the header of the bag. In certain implementations, the cut lines 500 can be spaced farther apart to produce bags with two or more handles in the header region of each bag. After the individual bag is cut along the cut lines 500, the fold created by corner 206 forms the top of the bag, the two edges 216 and 218 form the bottom of the bag, and the edges created by the cuts form the sides of the bag. The bag can then be filled by sealing two of the three open sides and filling the bag through the remaining open side. For example, in certain implementations, the edges 216 and 218 of the bag are sealed together to form the bottom of a bag, such as the bottom 126 of bag 100 in FIG. 1, while the folded top 211 forms the top of a bag, such as the top 120 of the bag 100. One of the two sides created by the cuts along cut lines 500, such as the sides 122 and 124 of bag 100, is also sealed, and the bag is filled through the remaining open side. After filling, the final open side is sealed to produce the finished, filled bag. In alternative implementations, both sides, such as the sides 122 and 124 of bag 100, are sealed first, and the bag is filled through the bottom, for example through bottom 126 of bag 100, which is then sealed to complete the bag.

While the bags shown in FIGS. 2-4 depict a reinforced header bag having a three-layer header, the systems, devices, and methods of the present invention may also be used to create header bags with additional reinforcing layers. For example, a bag with a four-layer reinforced header may be produced. The four-layer approach may create a stronger bag if the same material as the reinforcing material 202 is used by adding an additional interior layer or, alternatively, may provide a bag having substantially the same strength as the bag shown in FIGS. 2-4 by using a thinner reinforcing material. For example, a first reinforcing material that is doubled on the inside of a bag header may provide substantially the same strength to the header as a second reinforcing material that has double the thickness of the first reinforcing material but is not doubled inside the header. This arrangement may further reduce interference with graphic printing as the reinforcement material is thinner when it is initially placed together with a bag material before folding, and thus the transition in the bag material where the reinforcing material is placed is smoother.

Figure 5:
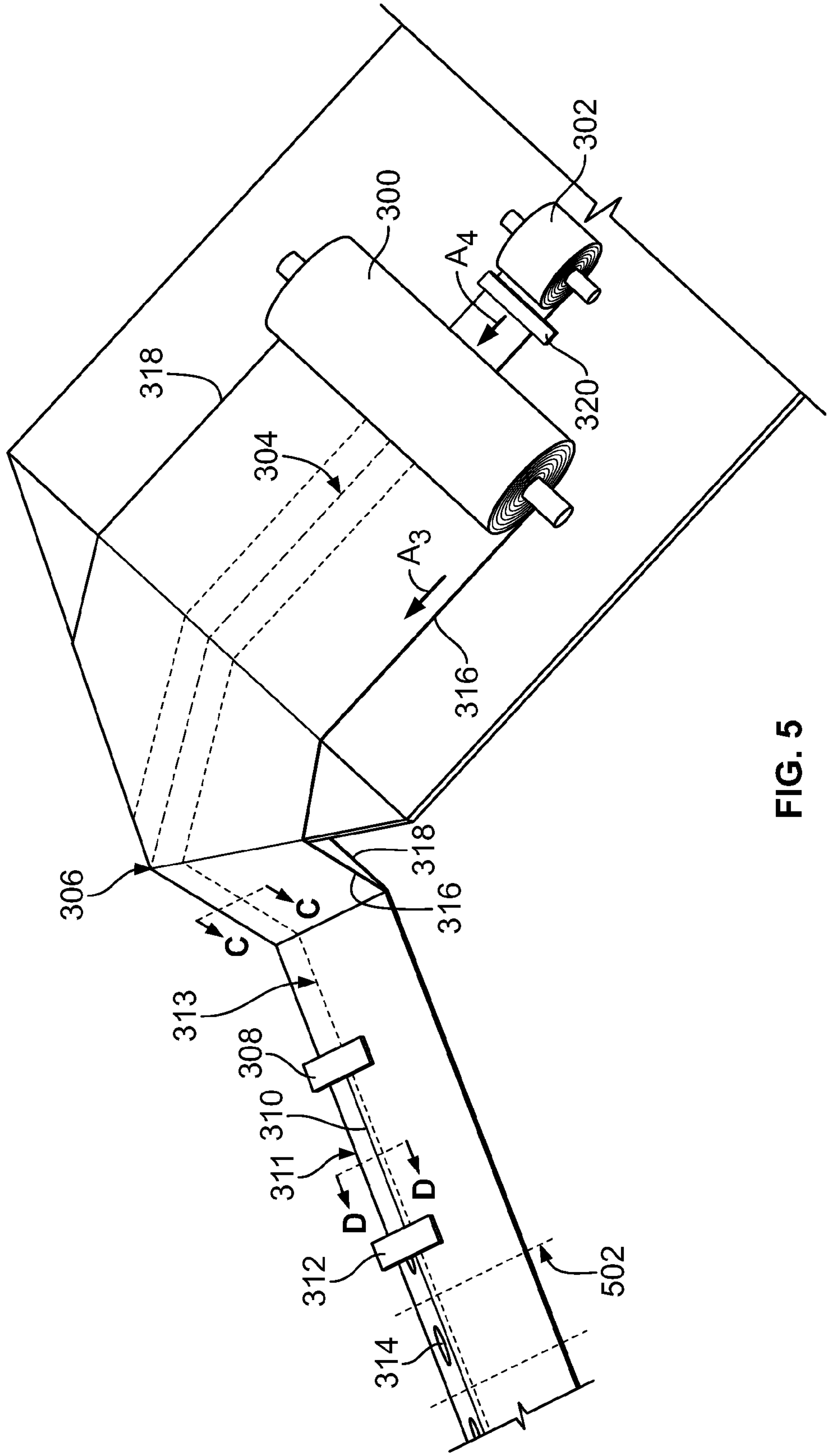
FIG. 5 shows an illustrative process for creating internally reinforced header bags.

FIG. 5 shows a method for creating a reinforced bag with a four-layer header. As shown in FIG. 5, bag material 300 is tracked along the line of Arrow $A_3$, while reinforcing material 302 is tracked in the direction of Arrow $A_4$ and passed underneath the bag material 300 in the orientation shown in FIG. 5. In contrast to the reinforcing material 202 shown in FIG. 2, which is aligned such that an edge of the reinforcing material 202 is adjacent the center line 204 of the bag material 200, the reinforcing material 302 is centered on the center line 304 of the bag material 300. This orientation of the reinforcing and bag materials causes the fold along the center line 304 to also fold the reinforcing material 302 in half, creating a double layer of internal reinforcement. As the bag material and reinforcing material are advanced, an optional attaching element 320 may be used to tack the two materials together. The attaching element 320 may be substantially the same as the attaching element 220 discussed above with respect to FIG. 2, and the attaching element 320 may be applied either before or after the reinforcing material 302 and the bag material 300 are brought into close contact. As discussed above with respect to the attaching element 220, the attaching element 320 may be used in certain implementations to provide additional support for maintaining the alignment of the two materials as they track through the production machinery.

The bag material 300 and reinforcing material 302 are folded at a corner 306, which folds both the bag and reinforcing materials at the center line 304 of the bag. As discussed above with respect to FIG. 2, the fold in the bag material 302 may be offset from the center line 304 of the bag, and the location of the reinforcing material 302 can be modified to maintain its alignment with alternative fold lines. The fold shown in FIG. 5 brings the edges 316 and 318 of the bag material together to create the bottoms of bags in the roll stock. The fold along the center line 304 forms the tops of the bags in the roll stock, and the internal reinforcing material 302 is folded in half to create a double-layer reinforcement inside the top of the bag.

Figure 6:
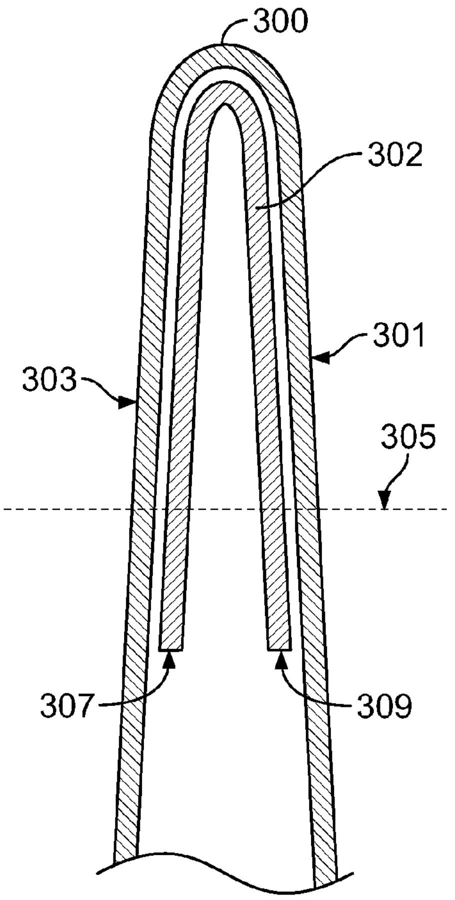
FIG. 6 shows a cross section of the roll stock shown in FIG. 5 taken along the line C-C shown in FIG. 5.

The orientation of the four layers of the reinforced header after the fold can be seen by viewing a cross section at line C-C shown in FIG. 5. The cross section of the roll stock viewed at line C-C is shown in FIG. 6. As can be seen in the cross section, the header of the bag is made up of four layers of material, with two layers of the reinforcing material 302 between two panels 301 and 303 of the bag material 300. To ensure that the entire header of the bag is reinforced by all four layers, a seal can be placed at the location of the line 305. Two lower portions 307 and 309 of the reinforcing material 302 extend below the location of the sealing line 305, and thus this seal location provides a full header reinforced by all four layers of the bag material 304 and reinforcing material 302. As described above, the location of the sealing line 305 can vary, though it is preferable that at least a portion of the seal be located above the edges of lower portions 307 and 309 of the reinforcing material 302 in order to ensure the seal passes through both layers of the reinforcing material 302 as well as the bag material 300.

A sealer 308 applies a seal 310 near the top 311 of the film roll stock such that a lower boundary 313 of the internal reinforcing material 302 extends below the seal. The seal 310 passes through all four layers of the reinforced header: two layers of the bag material 300 and two layers of the reinforcing material 302. The seal thus retains the reinforcing material within the header area of the bag and prevents the reinforcing material from shifting relative to the bag material.

Figure 7:
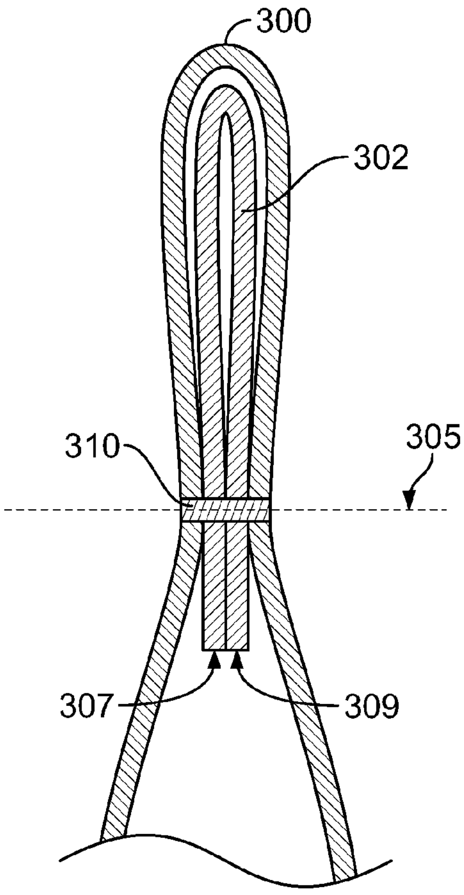
FIG. 7 shows a cross section of the roll stock shown in FIG. 5 taken along the line D-D shown in FIG. 5.

The reinforced header of the bag created by the seal 310 can be shown by viewing a cross section along the line D-D shown in FIG. 5. FIG. 7 shows the cross section along line D-D. The bag header is created by the seal 310 disposed at the location of line 305, and the double-layer reinforcing material 302 is kept in its desired position in the bag header. After the header is sealed by the sealer 308, a cutting element 312 punches handles into the reinforced header to complete the creation of the roll stock. The handles may be spaced to produce the desired design for individual bags, and the resulting bags may each have a single handle in the center or the header or may have multiple handles per bag. As discussed above with respect to cut lines 500 of FIG. 2, individual bags may be formed by cutting the film at the cut lines 502 shown in FIG. 5. The cut out bag may then be filled either through a bottom of the bag formed by edges 316 and 318 or may be filled through one of the sides of the bag formed by the cuts along cut lines 502.

While FIGS. 2-7 show manufacturing processes that provide a reinforcing material aligned with a fold of a bag material, in particular with a center line at which the bag material is folded, other alignments of reinforcing and bag materials may be utilized to produce an internally reinforced header bag. As discussed above with respect to FIGS. 2-7, a fold along a center line of the bag material forms the top of bags when a reinforcing material is aligned with the center line. In other implementations, however, the center line fold of a bag material may form the bottom of a set of bags. In such implementations, the placement of a reinforcing material may be modified to maintain the orientation of the reinforcing material in the header areas of bags ultimately produced from the bag material.

Figure 8:
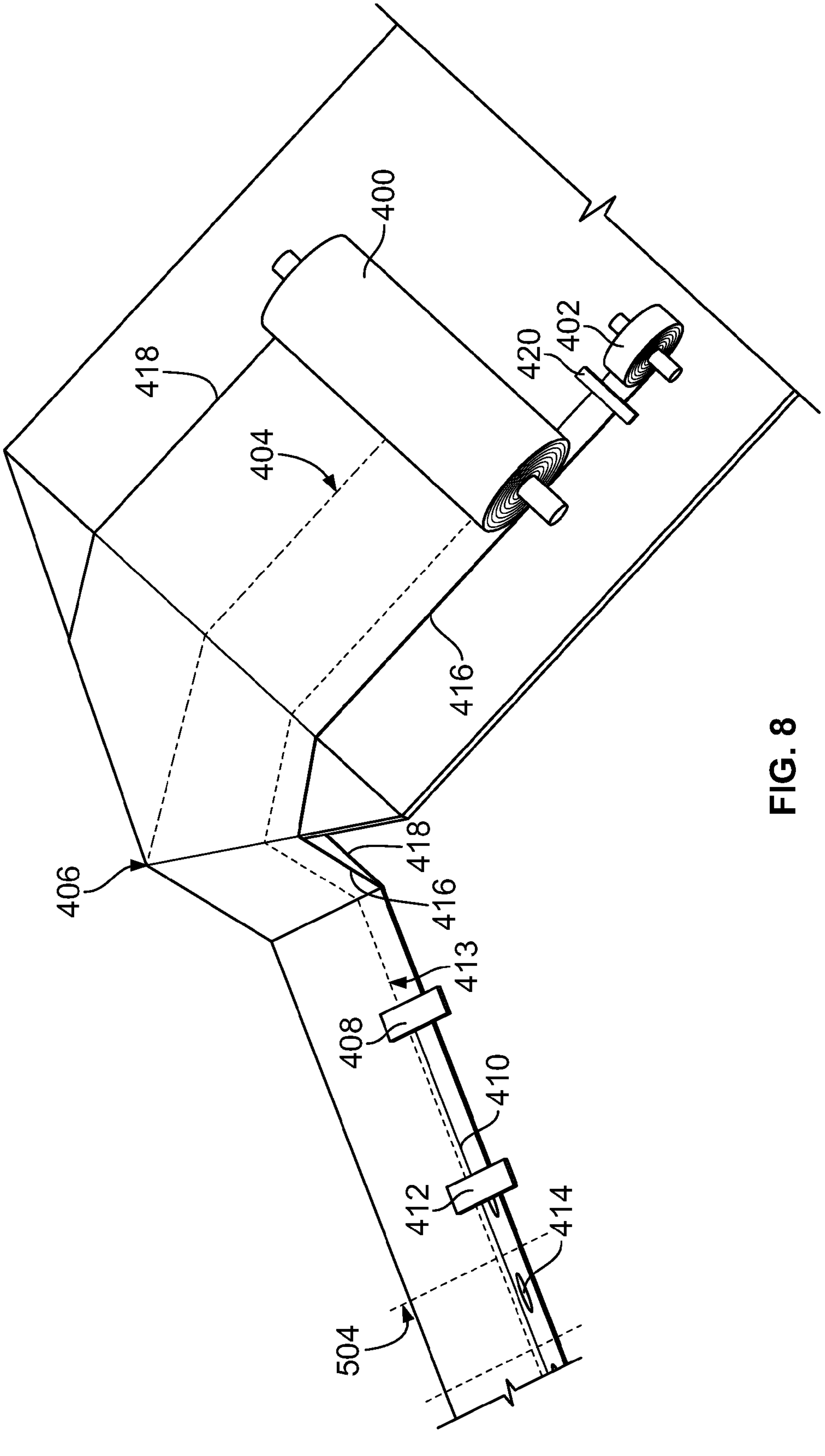
FIG. 8 shows an illustrative process for creating internally reinforced header bags.

FIG. 8 shows a process for manufacturing reinforced header bags in which folding a bag material creates a bag having a bottom formed by the fold in the material and a top formed by the edges of the material that are brought together by the fold. As shown in FIG. 8, a reinforcing material is provided and aligned near an edge 416 of a bag material 400. As discussed above with respect to FIG. 2, the reinforcing material 402 may be attached to the bag material 400 either temporarily or permanently by the attaching element 420. The function of the attaching element 420 may be substantially similar to the attaching element 220 discussed above with respect to FIG. 220. This attachment may be desired if, for example, the reinforcing material is more likely to move relative to the bag material 400 prior to sealing the materials due to the proximity of the reinforcing material 402 to the edge 416.

The bag material 400 is folded in half along center line 404 at corner 406. The fold along the center line 404 creates the bottoms of bags in the film roll, and the two edges 416 and 418 are brought together by the fold to form the tops of the bags. The two edges 416 and 418 may be sealed together to form the tops of the bags either before or after the reinforcing material 402 is sealed into the interior of the bag material 400.

The aligned bag material 400 and reinforcing material 402 are passed under a sealer 408 that applies a seal 410 to the bag and reinforcing materials. The seal passes through two layers of the bag material 400, formed by first and second panels of the bag material, and one layer of the reinforcing material 402. The seal 410 is applied at a location that leaves a lower boundary 413 of the reinforcing material 402 that extends below the seal 410. The sealed header then passes under a cutting element 412 that punches a series of handles 414 into the reinforced header. As discussed above with respect to cut lines 500 of FIG. 2, individual bags may be formed by cutting the film at the cut lines 504 shown in FIG. 8. The cut out bag may then be filled either through a top of the bag formed by edges 416 and 418 or may be filled through one of the sides of the bag formed by the cuts along cut lines 504.

It is to be understood that the foregoing description is merely illustrative and is not to be limited to the details given herein. While several embodiments have been provided in the present disclosure, it should be understood that the disclosed systems, devices, and methods, and their components, may be embodied in many other specific forms without departing from the scope of the disclosure.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein. All references cited herein are incorporated by reference in their entirety and made part of this application.

What is claimed is:

1. A method of manufacturing reinforced bags, comprising:

providing a bag material;

providing a reinforcing material;

aligning the reinforcing material with an area of the bag material that forms a header of the bag;

folding the bag material at a center line of the bag material, wherein the folding positions the reinforcing material in an internal region of the bag material; and applying a seal that passes through the bag material and the reinforcing material;

wherein the seal is applied through two layers of the bag material and the reinforcing material.

2. The method of claim 1, further comprising attaching the reinforcing material to the bag material before applying the seal.

3. The method of claim 2, wherein attaching the reinforcing material to the bag material comprises attaching the materials with one of a mechanical fastener, an adhesive, stitching, a hot tack seal, a cold pressure seal, or a static pin.

4. The method of claim 2, wherein:

attaching the reinforcing material to the bag material comprises temporarily attaching the materials; and applying a seal comprises permanently attaching the materials.

5. The method of claim 1, wherein the reinforcing material is aligned with the center line of the bag material.

6. The method of claim 5, wherein an edge of the reinforcing material is disposed adjacent to the center line.

7. The method of claim 6, wherein the seal is applied through two layers of the bag material and one layer of the reinforcing material.

8. The method of claim 7, wherein a lower portion of the reinforcing material extends below the seal.

9. The method of claim 5, wherein the reinforcing material is centered on the center line of the bag material.

10. The method of claim 9, wherein folding the bag material further comprises folding the reinforcing material at a center line of the reinforcing material.

11. The method of claim 9, wherein the seal is applied through two layers of the bag material and two layers of the reinforcing material.

12. The method of claim 11, wherein two lower portions of the reinforcing material extend below the seal.

13. The method of claim 1, wherein the reinforcing material is aligned with a first edge of the bag material.

14. The method of claim 13, further comprising sealing the first edge of the bag material to a second edge of the bag material.

15. The method of claim 14, wherein the sealed edges form a top of the bag.

16. The method of claim 1, further comprising applying a graphic to an exterior surface of the bag material after aligning the bag material and the reinforcing material.

17. The method of claim 1, wherein the bag material comprises an exterior graphic that is applied before providing the bag material.

18. The method of claim 1, wherein the seal prevents the reinforcing material from shifting relative to the bag material.

19. The method of claim 1, further comprising punching a handle into the header of the bag.

20. The method of claim 19, wherein the handle is punched through both the bag material and the reinforcing material.

21. The method of claim 20 wherein the folding forms a top edge of the reinforced bags and edges of the plastic film parallel to the top edge form an open bottom edge of the reinforced bags.

22. A method of manufacturing reinforced bags from a plastic film, comprising:

aligning a reinforcing material with an area of the plastic film that forms a header of the bag;

folding the plastic film along an edge to form a first panel and a second panel, with the reinforcing material between the first panel and the second panel; and applying a seal that passes through the first panel, the second panel, and the reinforcing material between the first panel and second panel.

* * * * *